(12) United States Patent
Nigo et al.

(10) Patent No.: US 10,008,893 B2
(45) Date of Patent: Jun. 26, 2018

(54) PERMANENT MAGNET-EMBEDDED ELECTRIC MOTOR, COMPRESSOR, AND REFRIGERATING AND AIR-CONDITIONING DEVICE

(71) Applicant: Mitsubishi Electric Corporation, Tokyo (JP)

(72) Inventors: Masahiro Nigo, Tokyo (JP); Kazuchika Tsuchida, Tokyo (JP); Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 14/908,196

(22) PCT Filed: Aug. 26, 2014

(86) PCT No.: PCT/JP2014/072233
§ 371 (c)(1),
(2) Date: Jan. 28, 2016

(87) PCT Pub. No.: WO2015/037428
PCT Pub. Date: Mar. 19, 2015

(65) Prior Publication Data
US 2016/0172912 A1 Jun. 16, 2016

(30) Foreign Application Priority Data

Sep. 13, 2013 (JP) .................... PCT/JP2013/074849

(51) Int. Cl.
*H02K 1/27* (2006.01)
*H02K 21/16* (2006.01)
(Continued)

(52) U.S. Cl.
CPC ............. *H02K 1/276* (2013.01); *F04B 35/04* (2013.01); *F04B 39/0005* (2013.01);
(Continued)

(58) Field of Classification Search
CPC ............ H02K 1/22; H02K 1/246; H02K 1/27; H02K 1/278; H02K 21/12; H02K 21/14; H02K 21/16; H02K 29/03
See application file for complete search history.

(56) References Cited

U.S. PATENT DOCUMENTS 6,262,508 B1 * 7/2001 Shibayama ............ H02K 21/00
310/152
6,353,275 B1 * 3/2002 Nishiyama ............ H02K 1/276
310/156.21
(Continued)

FOREIGN PATENT DOCUMENTS

CN 101714805 A 5/2010
CN 102957241 A 3/2013
(Continued)

OTHER PUBLICATIONS

International Search Report of the International Searching Authority dated Dec. 2, 2014 for the corresponding international application No. PCT/JP2014/072233 (and English translation).
(Continued)

*Primary Examiner* — Tran Nguyen
(74) *Attorney, Agent, or Firm* — Posz Law Group, PLC

(57) ABSTRACT

In an interior permanent magnet motor, each of permanent magnets has a radially-inner magnet contour surface, a radially-outer magnet contour surface, and a pair of side-end magnet contour surfaces. Each of magnet insertion holes has a radially-inner insertion hole contour surface, a radially-outer insertion hole contour surface, and a pair of side-end insertion hole contour surfaces. The radially-outer magnet contour surface and the radially-outer insertion hole contour surface are each formed by a first arc surface. The radially-inner magnet contour surface and the radially-inner insertion hole contour surface are each formed by a second arc surface and at least one straight surface configured to suppress (Continued)

movement of the permanent magnet along the magnet insertion hole having an arc shape.

14 Claims, 10 Drawing Sheets

(51) Int. Cl.
| | | |
|---|---|---|
| F04B 35/04 | (2006.01) | |
| F04B 39/12 | (2006.01) | |
| F04B 53/14 | (2006.01) | |
| F25B 31/02 | (2006.01) | |
| F04B 39/00 | (2006.01) | |

(52) U.S. Cl.
CPC ............ *F04B 39/121* (2013.01); *F04B 53/14* (2013.01); *F25B 31/026* (2013.01); *H02K 1/2766* (2013.01); *H02K 21/16* (2013.01); *H02K 2213/03* (2013.01)

(56) References Cited

U.S. PATENT DOCUMENTS

| | | | | | |
|---|---|---|---|---|---|
| 6,445,100 | B2* | 9/2002 | Tajima | .................... | H02K 1/276 310/12.13 |
| 6,525,442 | B2* | 2/2003 | Koharagi | ............. | H02K 1/2766 310/156.45 |
| 6,717,315 | B1* | 4/2004 | Tajima | .................... | H02K 1/278 310/156.45 |
| 6,774,521 | B2* | 8/2004 | Inayama | ................. | H02K 21/14 310/156.53 |
| 6,812,614 | B2* | 11/2004 | Yamamoto | ............ | H02K 19/103 310/156.01 |
| 6,919,663 | B2* | 7/2005 | Iles-Klumpner | ....... | H02K 1/276 310/156.01 |
| 7,042,127 | B2* | 5/2006 | Tsuruta | .................. | H02K 1/276 310/156.53 |
| 7,768,172 | B2* | 8/2010 | Takahata | .............. | H02K 1/2766 310/156.53 |
| 7,808,143 | B2* | 10/2010 | Lee | ...................... | H02K 1/2766 310/156.45 |
| 8,405,270 | B2* | 3/2013 | Li | .......................... | H02K 1/276 310/156.46 |
| 2004/0256940 | A1* | 12/2004 | Tsuruta | .................. | H02K 1/276 310/156.53 |
| 2006/0017345 | A1* | 1/2006 | Uchida | ................. | H02K 1/2766 310/156.56 |
| 2007/0205687 | A1* | 9/2007 | Murakami | ............. | H02K 21/16 310/156.28 |
| 2013/0088113 | A1* | 4/2013 | Yu | .......................... | H02K 29/03 310/156.38 |

FOREIGN PATENT DOCUMENTS

| | | | |
|---|---|---|---|
| CN | 103023166 | A | 4/2013 |
| EP | 1 734 637 | A1 | 12/2006 |
| JP | 05-236685 | A | 9/1993 |
| JP | 10-136592 | A | 5/1998 |
| JP | 11-146584 | A | 5/1999 |
| JP | H11-285185 | A | 10/1999 |
| JP | 2002-101585 | A | 4/2002 |
| JP | 2003-088071 | A | 3/2003 |
| JP | 2004-260972 | A | 9/2004 |
| JP | 2005-229798 | A | 8/2005 |
| JP | 2005-312102 | A | 11/2005 |
| JP | 2006-325348 | A | 11/2006 |
| JP | 2009-195088 | A | 8/2009 |
| JP | 4452488 | B2 | 2/2010 |
| JP | 3172376 | U | 11/2011 |
| JP | 2013-132163 | A | 7/2013 |
| JP | 201313216 | A * | 7/2013 ............... H02K 1/27 |
| WO | 01-043259 | A1 | 6/2001 |
| WO | 20130/61427 | A1 | 5/2013 |
| WO | 2013/094075 | A1 | 6/2013 |
| WO | 2013/114541 | A1 | 8/2013 |

OTHER PUBLICATIONS

Extended European Search Report dated Jan. 13, 2017 issued in corresponding EP patent application No. 14844440.9.
Office Action dated May 18, 2017 issued in corresponding CN patent application No. 201480049895.6 (and English ranslation).
Office Action dated Apr. 25, 2017 issued in corresponding EP patent application No. 14 844 440.9.

* cited by examiner

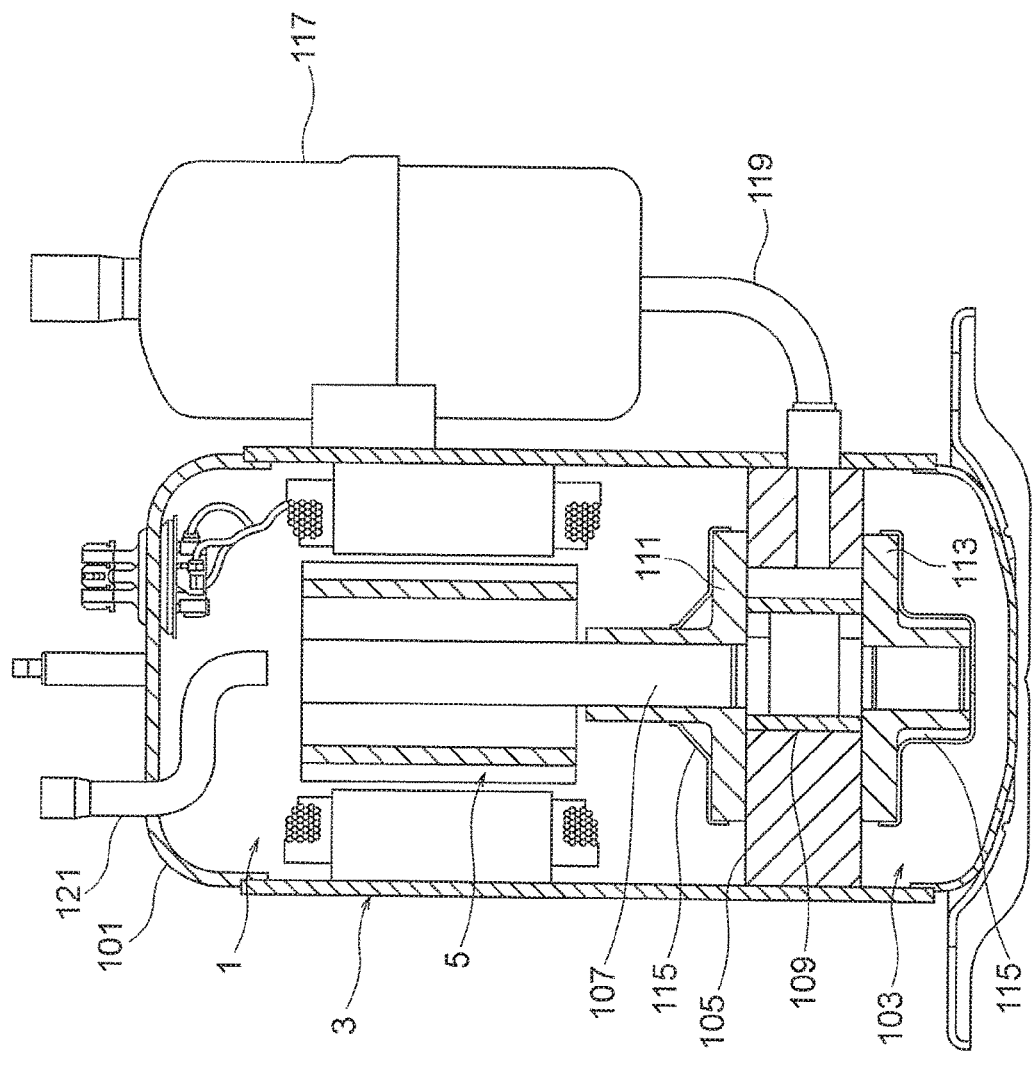

PERMANENT MAGNET-EMBEDDED ELECTRIC MOTOR, COMPRESSOR, AND REFRIGERATING AND AIR-CONDITIONING DEVICE

CROSS REFERENCE TO RELATED APPLICATIONS

This application is a U.S. national stage application of PCT/JP2014/072233 filed on Aug. 26, 2014, which claims priority to International Application No. PCT/JP2013/074849 filed on Sep. 13, 2013, the contents of which are incorporated herein by reference.

TECHNICAL FIELD

The present invention relates to an interior permanent magnet motor, a compressor, and a refrigeration and air conditioning apparatus.

BACKGROUND

As a related-art interior permanent magnet motor, in Patent Literature 1, there is disclosed a configuration in which a plurality of arc-shaped permanent magnets are embedded in a rotor core so as to be convex toward a center side of a rotor. The permanent magnets are respectively inserted into magnet insertion holes formed in the rotor core, and air gap portions are secured respectively between both side end surfaces that are both ends of an arc of each of the magnet insertion holes and both side end surfaces that are both ends of the arc of each of the permanent magnets. Further, assuming that a distance between the side end surface of the permanent magnet and an outer peripheral surface of the rotor core is represented by Q, and an air gap between a stator and the rotor is represented by Lg, a relationship of Lg<Q<3Lg is satisfied. Assuming that an opening angle of portions each receiving the side end surface of the permanent magnet of the magnet insertion hole is represented by Am, and an opening angle of a tooth of the stator is represented by As, a relationship of (1/10)As<Am<(1/4)As is satisfied. In this manner, it is intended to prevent entry of a demagnetizing field into the permanent magnet, to thereby enhance the demagnetization resistance.

PATENT LITERATURE

[PTL 1] JP 11-146584 A

As described above, in the configuration in which the plurality of arc-shaped permanent magnets are embedded in the rotor core so as to be convex toward the center side of the rotor, a portion of the permanent magnet, which is closest to the outer peripheral surface of the rotor, corresponds to each of the side end surfaces of the arc shape of the permanent magnet. When a large current flows through the stator to apply a demagnetizing field to the rotor, the side end surfaces of the permanent magnet are most easily demagnetized. Therefore, the air gap portions are respectively secured between the magnet insertion hole and the side end surfaces of the permanent magnet, thereby suppressing the demagnetization of the permanent magnet.

However, in the arc-shaped permanent magnet, in general, an arc that is a contour of the permanent magnet on a radially outer side and an arc that is a contour of the permanent magnet on a radially inner side are concentric with each other. Thus, the permanent magnet may be moved inside the magnet insertion hole due to an electromagnetic force generated during the drive of the motor, thereby causing difficulty in securing the air gap portions configured to suppress the demagnetization in some cases.

Further, as a countermeasure therefor, the following method is conceivable. A width of both the side end surfaces of the magnet insertion hole is set smaller than a width of both the side end surfaces of the permanent magnet so as to form a pair of abutment portions in the vicinities of the side end surfaces of the magnet insertion hole, which are configured to be held in contact with the side end surfaces of the permanent magnet, respectively. Through the contact between those abutment portions and both the side end surfaces of the permanent magnet, the movement of the permanent magnet is restricted while securing the air gap portions between both the side end surfaces of the magnet insertion hole and both the side end surfaces of the permanent magnet.

However, in the above-mentioned method, the width of the magnet insertion hole is reduced so that the magnetic resistance is reduced. Accordingly, an effect of suppressing the demagnetization, which is attained by the air gap portions, may be reduced.

SUMMARY

The present invention has been made in view of the above, and has an object to provide an interior permanent magnet motor capable of restricting movement of a permanent magnet without relying on the presence of abutment portions of a magnet insertion hole to be held in contact with side end surfaces of the permanent magnet.

In order to achieve the object described above, according to one embodiment of the present invention, there is provided an interior permanent magnet motor, including: a stator; and a rotor rotatably arranged so as to be opposed to the stator, in which the rotor includes a rotor core having a plurality of magnet insertion holes formed therein, into which corresponding permanent magnets are respectively inserted, in which the plurality of permanent magnets and the plurality of magnet insertion holes are each formed into an arc shape that is convex toward a center side of the rotor, in which each of the permanent magnets has a radially-inner magnet contour surface, a radially-outer magnet contour surface, and a pair of side-end magnet contour surfaces, in which each of the magnet insertion holes has a radially-inner insertion hole contour surface, a radially-outer insertion hole contour surface, and a pair of side-end insertion hole contour surfaces, in which the radially-outer magnet contour surface and the radially-outer insertion hole contour surface are each formed by a first arc surface, in which the radially-inner magnet contour surface and the radially-inner insertion hole contour surface are each formed by a second arc surface and at least one straight surface configured to suppress movement of the permanent magnet along the magnet insertion hole having the arc shape, and in which air gap portions are formed between the side-end magnet contour surfaces and the side-end insertion hole contour surfaces under a state in which the permanent magnets are inserted into the corresponding magnet insertion holes.

Further, when viewed in an extending direction of a rotation center line CL of the rotor, at least a part of the straight surface of the radially-inner magnet contour surface and at least a part of the straight surface of the radially-inner insertion hole contour surface may be held in contact with each other.

In addition, when viewed in the extending direction of the rotation center line CL of the rotor, at least a part of the radially-outer magnet contour surface and at least a part of the radially-outer insertion hole contour surface may be held in contact with each other, at least a part of the second arc surface of the radially-inner magnet contour surface and at least a part of the second arc surface of the radially-inner insertion hole contour surface may be held in contact with each other, and at least the part of the straight surface of the radially-inner magnet contour surface and at least the part of the straight surface of the radially-inner insertion hole contour surface may be held in contact with each other.

The straight surface may be formed in a direction orthogonal to the corresponding magnetic pole center line when viewed in a cross-section orthogonal to the rotation center line of the rotor.

Assuming that a thickness of the permanent magnet between the first arc surface and the second arc surface is represented by T1, and a thickness of the permanent magnet on the magnetic pole center line is represented by T2, the thickness T1 and the thickness T2 may fall within a range of $0.85 \leq (T2/T1) \leq 0.95$.

At least one air hole may be formed in the rotor core so as to be positioned on a radially inner side with respect to the straight surface of the each of the magnet insertion holes.

An air gap may be secured between a rotor outer peripheral surface of the rotor and a stator inner peripheral surface of the stator. When viewed in the cross-section orthogonal to the rotation center line of the rotor, the rotor outer peripheral surface may be formed by a plurality of first radial surfaces and a plurality of second radial surfaces. Each of the first radial surfaces may be positioned in a corresponding magnetic pole center portion on the rotor outer peripheral surface. Each of the second radial surfaces may be positioned in a corresponding inter-pole portion on the rotor outer peripheral surface. The first radial surface may bulge toward a radially outer side to a higher degree than the second radial surface so that the air gap is varied in a manner of being increased as approaching from each of the magnetic pole center portions to the adjacent inter-pole portions.

The permanent magnets may be ferrite magnets.

Further, in order to achieve the same object, according to one embodiment of the present invention, there is also provided a compressor. The compressor of the one embodiment of the present invention includes, in an airtight container: a motor; and a compression element. The motor is the above-mentioned interior permanent magnet motor of the one embodiment of the present invention.

Further, in order to achieve the same object, according to one embodiment of the present invention, there is also provided a refrigeration and air conditioning apparatus. The refrigeration and air conditioning apparatus of the one embodiment of the present invention includes the above-mentioned compressor of the one embodiment of the present invention as a component of a refrigeration cycle.

According to the one embodiment of the present invention, the movement of the permanent magnet may be restricted without relying on the presence of the abutment portions of the magnet insertion hole to be held in contact with the side end surfaces of the permanent magnet.

BRIEF DESCRIPTION OF DRAWINGS

FIG. 10 is a vertical sectional view of a rotary compressor having the interior permanent magnet motor mounted therein according to a fifth embodiment of the present invention.

DETAILED DESCRIPTION

Figure 4:
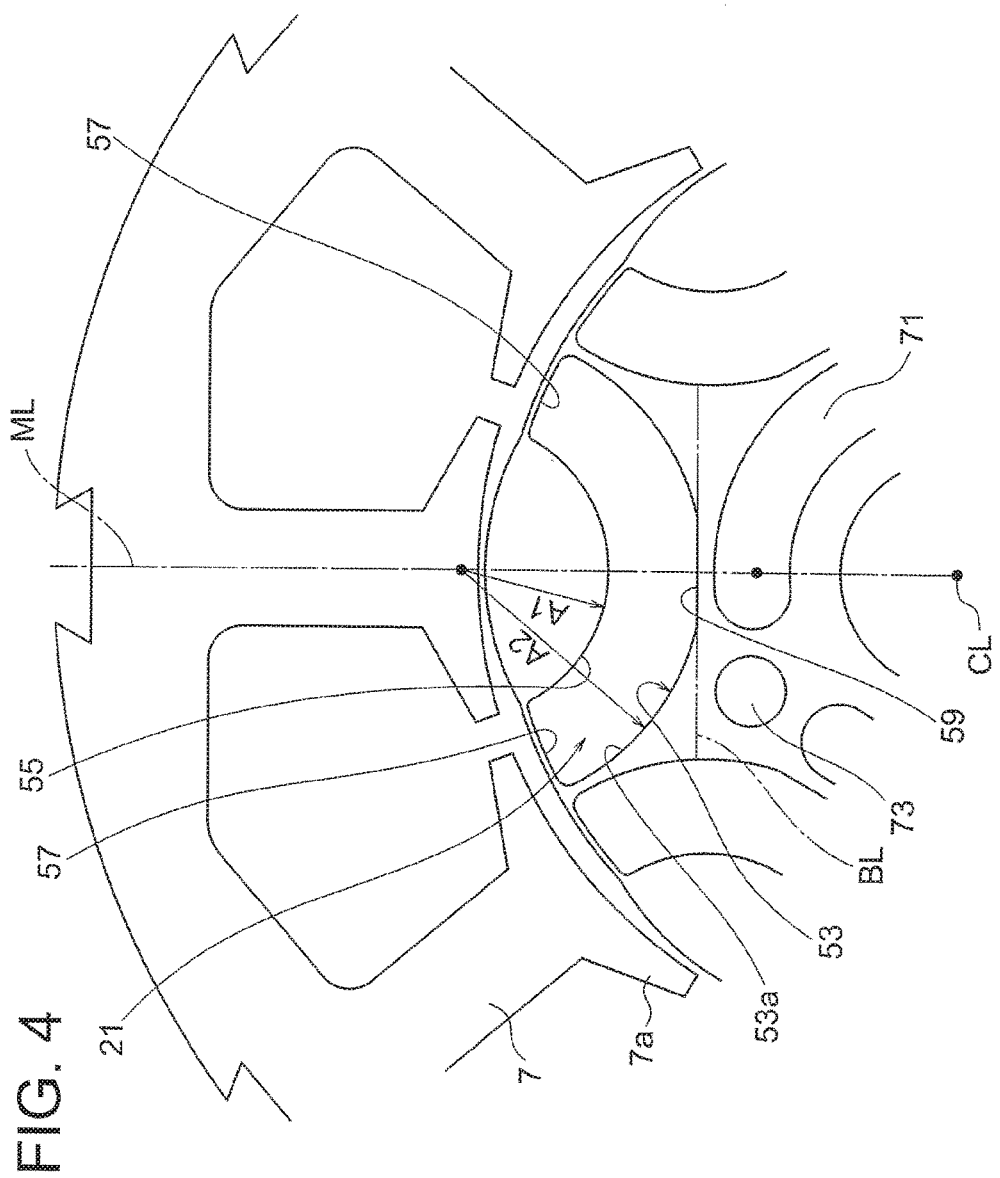
FIG. 4 is a view for illustrating a shape of a magnet insertion hole under a state in which the permanent magnet is not inserted in FIG. 2.
Figure 7:
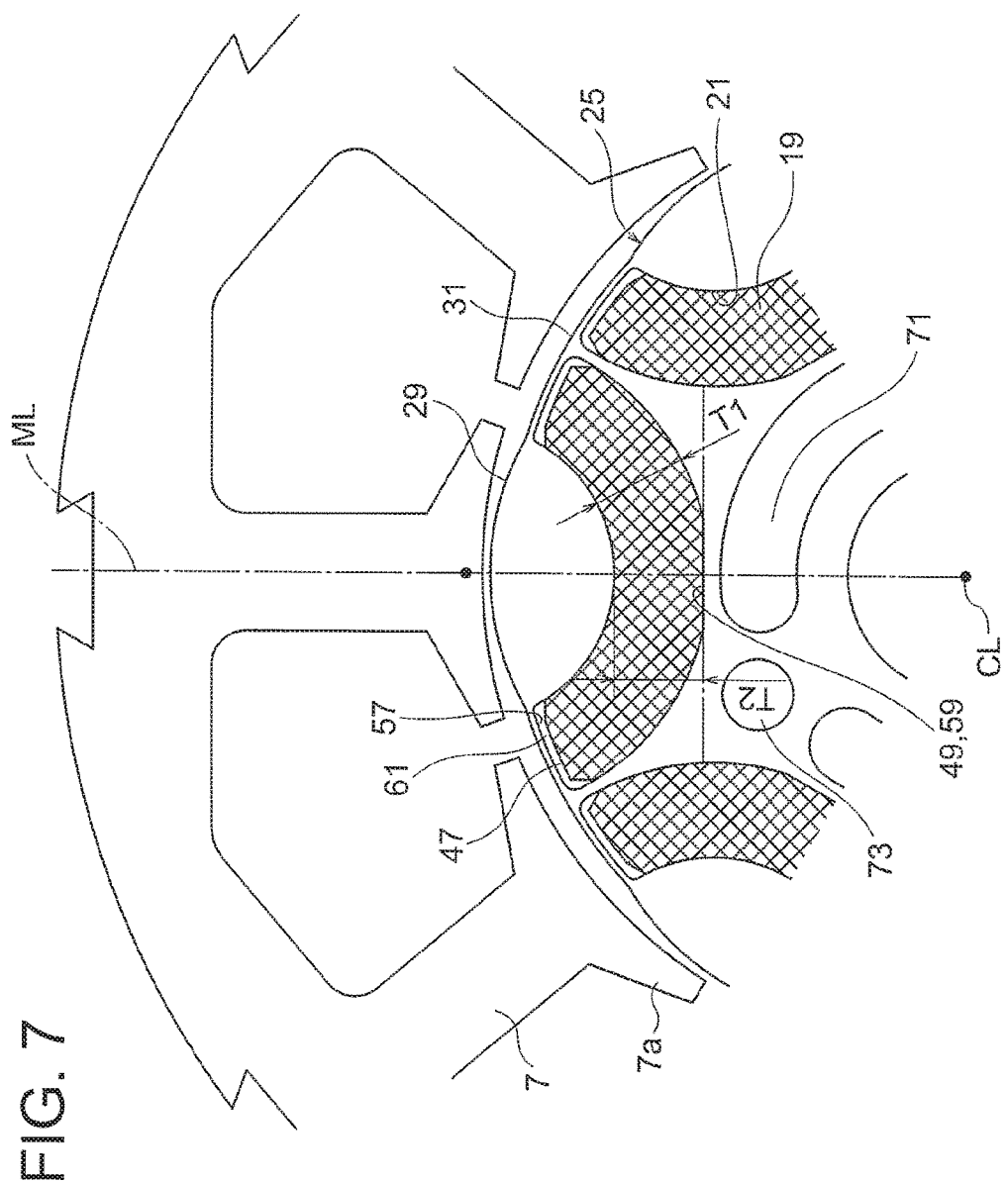
FIG. 7 is a view according to a second embodiment of the present invention in the same manner as that of FIG. 2.

Now, embodiments of the present invention are described referring to the accompanying drawings. Note that, in the drawings, the same reference symbols represent the same or corresponding parts. Note that, FIG. 2, FIG. 4, and FIG. 7 are all partially enlarged views extracting a part from an entire configuration in the illustration of FIG. 1, and for the sake of clarity of illustration, the hatching is omitted.

First Embodiment

Figure 1:
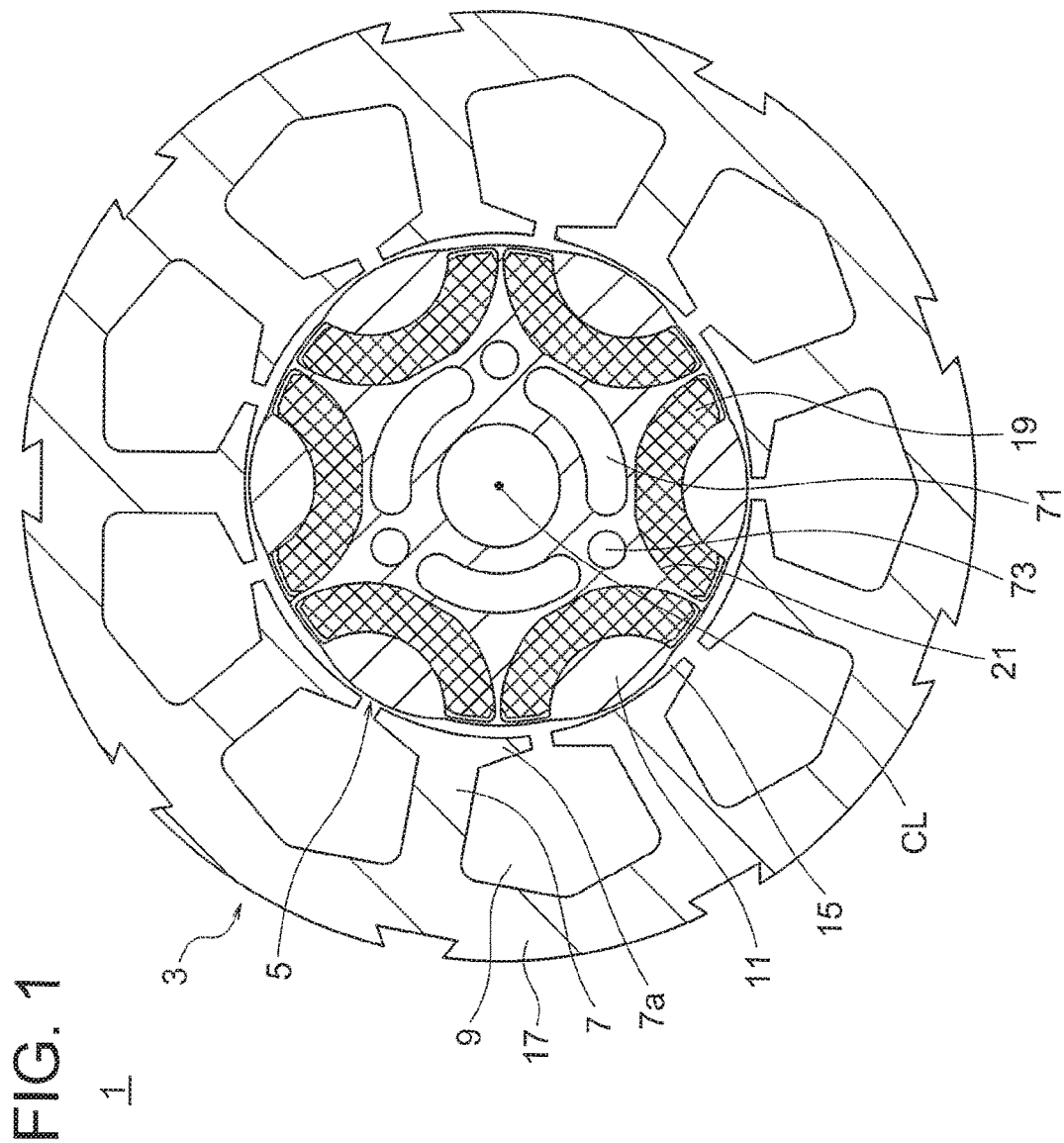
FIG. 1 is a view for illustrating a cross-section orthogonal to a rotation center line of an interior permanent magnet motor according to a first embodiment of the present invention.
Figure 2:
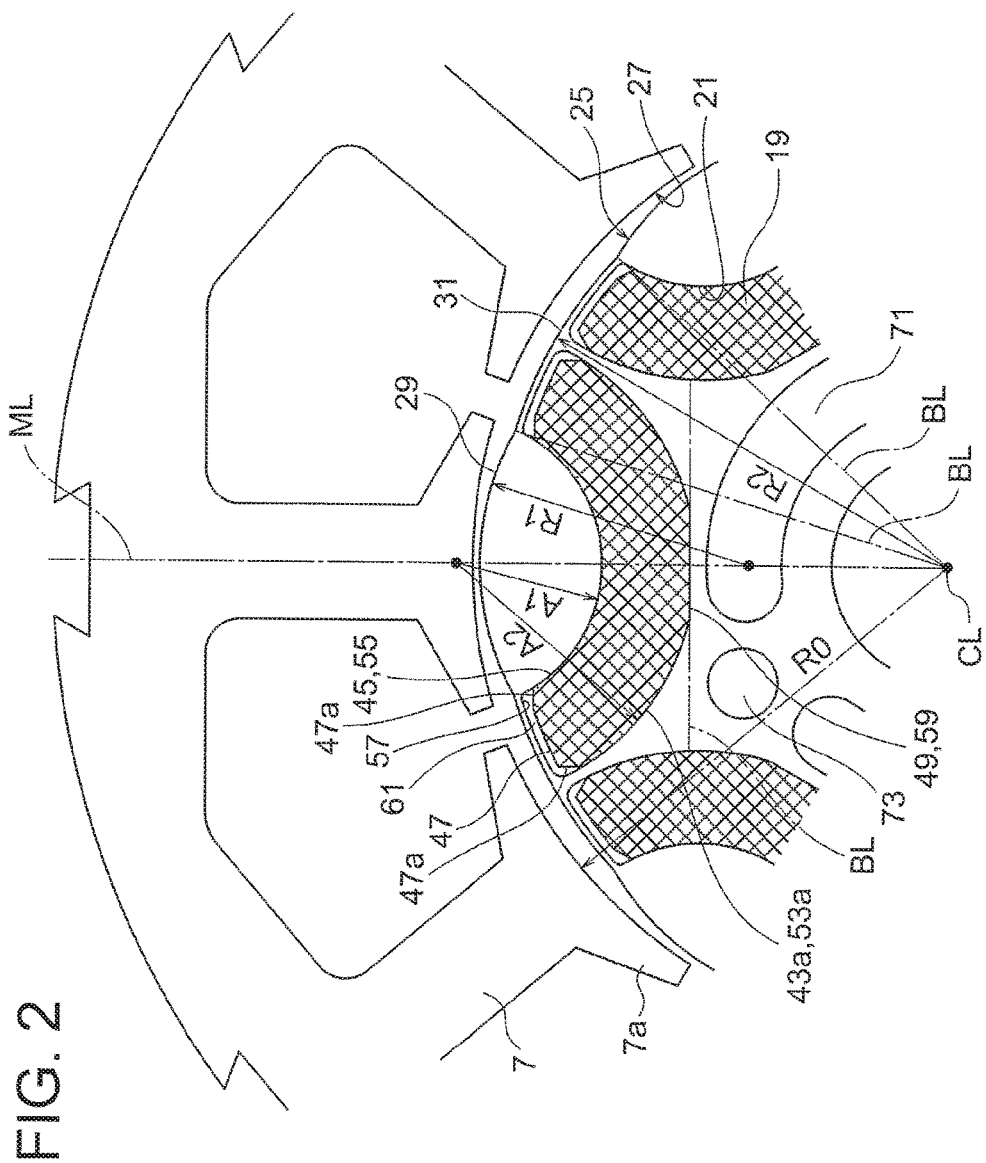
FIG. 2 is a view for illustrating a peripheral part of one permanent magnet and a peripheral part of one tooth tip portion corresponding to the one permanent magnet in FIG. 1 in an enlarged manner.
Figure 3:
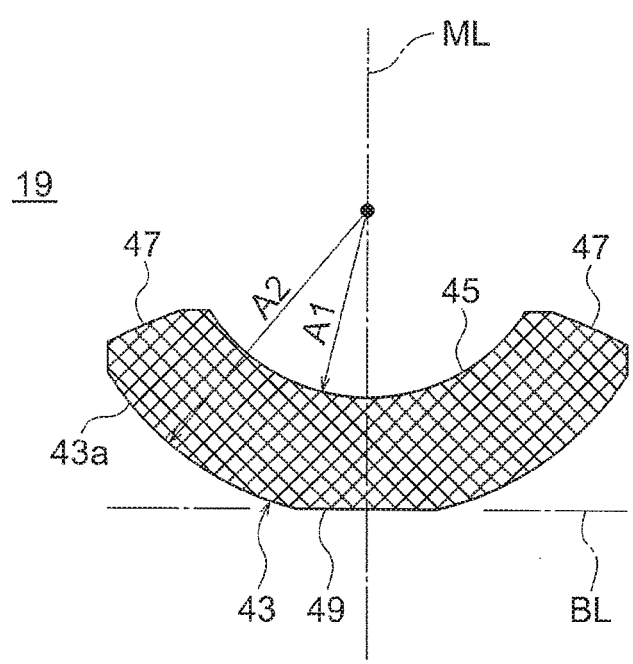
FIG. 3 is a view according to the first embodiment, for illustrating a shape of one permanent magnet.

FIG. 1 is a view for illustrating a cross-section orthogonal to a rotation center line of an interior permanent magnet motor according to a first embodiment of the present invention. FIG. 2 is a view for illustrating a peripheral part of one permanent magnet and a peripheral part of one tooth tip portion corresponding to the one permanent magnet in an enlarged manner. FIG. 3 is a view for illustrating a shape of one permanent magnet. FIG. 4 is a view for illustrating a shape of a magnet insertion hole under a state in which the permanent magnet is not inserted.

An interior permanent magnet motor 1 includes a stator 3 and a rotor 5 rotatably arranged so as to be opposed to the stator. The stator 3 includes a plurality of tooth portions 7. Each of the plurality of tooth portions 7 is adjacent to other tooth portions 7 through intermediation of corresponding slot portions 9. The plurality of tooth portions 7 and a plurality of the slot portions 9 are arranged alternately at equal intervals in a circumferential direction. A publicly known stator winding (not shown) is wound around each of the plurality of tooth portions 7 in a publicly known manner.

The rotor 5 includes a rotor core 11 and a shaft 13. The shaft 13 is coupled to an axial center portion of the rotor core 11 by shrink fitting, press fitting, or the like to transmit rotational energy to the rotor core 11. An air gap 15 is secured between an outer peripheral surface of the rotor 5 and an inner peripheral surface of the stator 3.

In such a configuration, the rotor 5 is held on an inner side of the stator 3 through intermediation of the air gap 15 so as to be rotatable about a rotation center line CL (rotation center of the rotor, axial line of the shaft). Specifically, a current having a frequency synchronized with an instructed number of revolutions is supplied to the stator 3 to generate a rotation magnetic field, thereby rotating the rotor 5. The air gap 15 between the stator 3 and the rotor 5 is, for example, an air gap of from 0.3 mm to 1 mm.

Next, configurations of the stator 3 and the rotor 5 are described in detail. The stator 3 includes a stator core 17. The stator core 17 is formed by, for example, punching magnetic steel plates each having a thickness of from about 0.1 mm to about 0.7 mm into a predetermined shape, and laminating a predetermined number of the magnetic steel plates while fastening the magnetic steel plates by caulking. In this case, as an example, the magnetic steel plates each having a thickness of 0.35 mm are used.

The stator core 17 has nine slot portions 9 radially formed on a radially inner side thereof at substantially equal intervals in the circumferential direction. Further, a region between the adjacent slot portions 9 in the stator core 17 is referred to as the tooth portion 7. Each of the tooth portions 7 extends in a radial direction, and protrudes toward the rotation center line CL. Further, a most part of the tooth portion 7 has a substantially constant width in the circumferential direction over a range from a radially outer side to a radially inner side. However, a distal end portion of the tooth portion 7, which is located on the radially innermost side, has a tooth tip portion 7a. Each tooth tip portion 7a is formed into an umbrella shape with its both side portions expanding in the circumferential direction.

The stator winding (not shown) forming a coil (not shown) configured to generate a rotational magnetic field is wound around the tooth portion. The coil is formed by directly winding a magnet wire around the magnetic pole tooth through intermediation of an insulator. This winding method is referred to as a concentrated winding. The coil is connected in three-phase Y connection. The number of turns and a wire diameter of the coil are determined depending on required characteristics (number of revolutions, torque, and the like), the voltage specifications, and the sectional area of the slot. In this case, in order to facilitate the winding, separated teeth are developed in a band shape, and, for example, a magnet wire having a wire diameter φ of from about 0.8 mm to about 1.0 mm is wound around each of the magnetic pole teeth by about 50 turns to about 100 turns. After the winding, the separated teeth are rounded into an annular shape and welded, to thereby form the stator.

The rotatably held shaft 13 is arranged in the vicinity of a center of the stator 3. Further, the rotor 5 is fitted onto the shaft 13. The rotor 5 includes the rotor core 11, and similarly to the stator core 17, the rotor core 11 is also formed by, for example, punching magnetic steel plates each having a thickness of from about 0.1 mm to about 0.7 mm into a predetermined shape, and laminating a predetermined number of the magnetic steel plates while fastening the magnetic steel plates by caulking. In this case, as an example, the magnetic steel plates each having a thickness of 0.35 mm are used. Inter-pole thin portions having a uniform thickness are each secured between a rotor outer peripheral surface 25 and a side-end insertion hole contour surface 57 described later. Those inter-pole thin portions each serve as a path for a leakage magnetic flux between the adjacent magnetic poles, and hence it is preferred that the inter-pole thin portion have a thickness as small as possible. In this case, as an example, the inter-pole thin portion is set to 0.35 mm, which is approximately as large as the thickness of the magnetic steel plate, as the minimum width that allows press work.

A plurality of permanent magnets 19 (six permanent magnets 19 in this specific example), which are magnetized so that the N poles and the S poles are alternately positioned, are arranged in the rotor core 11. Referring to FIG. 1, each of the permanent magnets 19 is curved into an arc shape and arranged so that a convex portion side of the arc shape faces the center side of the rotor 5. In more detail, magnet insertion holes 21 as many as the number of the plurality of permanent magnets 19 are formed in the rotor core 11. The corresponding permanent magnets 19 are inserted into a plurality of the magnet insertion holes 21, respectively. That is, the plurality of permanent magnets 19 and the plurality of magnet insertion holes 21 are each formed into an arc shape that is convex toward the center side of the rotor 5. Further, as illustrated in FIG. 1, one permanent magnet 19 is inserted into one magnet insertion hole 21. Note that, the number of magnetic poles of the rotor 5 may be any number as long as the number is two or more. The case of six poles is exemplified in this embodiment.

FIG. 2 is a view for illustrating a peripheral part of one permanent magnet and a peripheral part of one tooth tip portion corresponding to the one permanent magnet in FIG. 1 in an enlarged manner. As illustrated in FIG. 2, the air gap 15 between the rotor outer peripheral surface 25 and a stator inner peripheral surface 27 is varied in the circumferential direction. In the first embodiment, a radius R0 of the stator inner peripheral surface 27 from the rotation center line CL is constant. Therefore, the rotor outer peripheral surface 25 partially bulges toward the radially outer side so that the above-mentioned variation of the air gap 15 in the circumferential direction is attained.

The rotor outer peripheral surface 25 has a plurality of first radial surfaces 29 and a plurality of second radial surfaces 31 when viewed in the cross-section in FIG. 2 (cross-section orthogonal to the rotation center line CL). Each of the first radial surfaces 29 corresponds to a cross-section of a convex surface positioned on a corresponding magnetic pole center portion on the rotor outer peripheral surface 25. Each of the second radial surfaces 31 corresponds to a cross-section of a cylindrical surface positioned on a corresponding inter-pole portion on the rotor outer peripheral surface 25. The first radial surfaces 29 bulge toward the radially outer side to a higher degree than the second radial surfaces 31. Each of the second radial surfaces 31 is continuous from end portions of a corresponding pair of the first radial surfaces 29. That is, the plurality of first radial surfaces 29 and the plurality of second radial surfaces 31 are alternately arrayed in the circumferential direction.

With the rotor outer peripheral surface 25 and the stator inner peripheral surface 27, which are opposed to each other as described above, the air gap 15 is varied over an entire circumference in a manner of being increased as approaching from each of the magnetic pole center portions to the adjacent inter-pole portions.

As a specific example, a minimum air gap 15 on a magnetic pole center line ML among the air gaps 15 each between the first radial surface 29 of the rotor outer peripheral surface 25 and the stator inner peripheral surface 27 is 0.6 mm. Further, in the cross-section of FIG. 2, an air gap 15 on a boundary line BL passing through an intersection point (connection point, boundary point) between the first radial surface 29 and the second radial surface 31 is 0.9 mm. The air gap 15 between the first radial surface 29 and the stator inner peripheral surface 27 becomes smaller as approaching to the magnetic pole center ML in a range of the first radial surface 29. On the other hand, an air gap 15 between the second radial surface 31 and the stator inner peripheral surface 27 is uniform in a range of the second radial surface 31. Note that, each of the first radial surfaces 29 and a pair of the second radial surfaces 31 adjacent to both sides of the corresponding first radial surface 29 are formed to be line symmetric with respect to the magnetic pole center ML of the corresponding first radial surface 29.

Note that, a center of a radius R1 of the above-mentioned first radial surface 29 is located at a position on the magnetic pole center ML, which is displaced toward a corresponding magnetic pole side (radially outer side) from a rotor center (rotation center line CL). A center of a radius R2 of the second radial surface 31 and a center of the radius R0 of the stator inner peripheral surface 27 are located on the rotor center (rotation center line CL).

Next, details of the permanent magnets and the magnet insertion holes are described. FIG. 3 is a view for illustrating a shape of one permanent magnet according to the first embodiment. FIG. 4 is a view for illustrating a shape of the magnet insertion hole under a state in which the permanent magnet is not inserted in FIG. 2.

The permanent magnets 19 each have a radially-inner magnet contour surface 43, a radially-outer magnet contour surface 45, and a pair of side-end magnet contour surfaces 47. Further, the magnet insertion holes 21 each have a radially-inner insertion hole contour surface 53, a radially-outer insertion hole contour surface 55, and a pair of side-end insertion hole contour surfaces 57. The radially-outer magnet contour surface 45 and the radially-outer insertion hole contour surface 55 are each formed by a first arc surface having a first arc radius A1. On the other hand, the radially-inner magnet contour surface 43 is formed by a straight surface 49 and a second arc surface 43a having a second arc radius A2 larger than the first arc radius A1. Similarly, the radially-inner insertion hole contour surface 53 is formed by a straight surface 59 and a second arc surface 53a having the second arc radius A2.

Note that, the permanent magnet 19 is inserted into the magnet insertion hole 21, and hence the first arc radius A1 and the second arc radius A2 in the magnet insertion hole 21 and the first arc radius A1 and the second arc radius A2 in the permanent magnet 19 are not equal to each other in an extremely strict sense. However, the permanent magnet 19 is closely fitted into the magnet insertion hole 21, and for the sake of easy understanding, common names and reference symbols are used on the permanent magnet side and on the magnet insertion hole side.

The first arc radius A1 and the second arc radius A2 have a common radius center, and the common radius center is located on the radially outer side with respect to the permanent magnet 19 and the magnet insertion hole 21 and on the corresponding magnetic pole center line ML. In other words, the radially-inner magnet contour surface (radially-inner insertion hole contour surface) and the radially-outer magnet contour surface (radially-outer insertion hole contour surface) are formed concentrically. The center of the first arc surface and the center of the second arc surface coincide with an orientation center (orientation focal point) of the permanent magnet.

When viewed in the cross-section having the rotation center line CL of the rotor 5 as the normal as in FIG. 2 to FIG. 4, the straight surface 49 and the straight surface 59 extend along a virtual base plane orthogonal to the magnetic pole center line ML. That is, the straight surface 49 and the straight surface 59 are formed in a direction orthogonal to the corresponding magnetic pole center line ML.

Further, in FIG. 2 and FIG. 3, the pair of side-end magnet contour surfaces 47 each connect together corresponding end portions of the radially-inner magnet contour surface 43 and the radially-outer magnet contour surface 45. In FIG. 2 and FIG. 4, the pair of side-end insertion hole contour surfaces 57 each connect together corresponding end portions of the radially-inner insertion hole contour surface 53 and the radially-outer insertion hole contour surface 55.

As illustrated in FIG. 2, under a state in which the permanent magnet 19 is inserted into the corresponding magnet insertion hole 21, air gap portions 61 are formed each between the side-end magnet contour surface 47 and the side-end insertion hole contour surface 57. Further, the radially-outer magnet contour surface 45 and the radially-outer insertion hole contour surface 55 are held in contact with each other, the second arc surface 43a of the radially-inner magnet contour surface 43 and the second arc surface 53a of the radially-inner insertion hole contour surface 53 are held in contact with each other, and the straight surface 49 of the radially-inner magnet contour surface 43 and the straight surface 59 of the radially-inner insertion hole contour surface 53 are held in contact with each other. Note that, as one example, the size of the air gap portion 61 (interval between the side-end magnet contour surface 47 and the side-end insertion hole contour surface 57) is about 1.5 mm.

Further, when viewed in the cross-section having the rotation center line CL of the rotor 5 as the normal, the permanent magnet 19 and the magnet insertion hole 21 are each formed to be line symmetric with respect to the corresponding magnetic pole center line ML. In particular, in the first embodiment, when viewed in the cross-section having the rotation center line CL of the rotor 5 as the normal, the straight surface 49 and the straight surface 59 are each formed to be line symmetric with respect to the corresponding magnetic pole center line.

Next, an action of the interior permanent magnet motor according to the first embodiment, which is constructed as described above, is described. In the rotor in which the arc-shaped permanent magnets are arranged in the rotor core so that the convex portion sides face the center side of the rotor, the surface of each magnet is curved into an arc shape. Thus, the area of the surface of each magnet can be increased to increase the amount of the magnetic flux generated from the permanent magnets. Thus, the current to be applied to the motor can be reduced, thereby being capable of attaining the highly efficient motor. Alternatively, the volume of the motor can be reduced. However, in the rotor having the above-mentioned configuration, a portion of the permanent magnet, which is closest to the rotor outer peripheral surface (having the smallest magnetic resistance), corresponds to side surface portions of the arc-shaped permanent magnet. When a large current flows through the stator to apply a demagnetizing field to the rotor, the side surface portions of the permanent magnet are most easily demagnetized. Therefore, the side end is formed smaller in the permanent magnet than in the magnet insertion hole so as to secure the air gap portions each between the side-end insertion hole contour surface of the magnet insertion hole and the side-end magnet contour surface of the permanent magnet, thereby enabling the permanent magnet to be hardly demagnetized. Note that, chamfered portions 47a, which may further increase the interval from the side-end insertion hole contour surface 57 of the magnet insertion hole 21, are formed in the permanent magnet at portions between the side-end magnet contour surface and the radially-inner magnet contour surface and between the side-end magnet contour surface and the radially-outer magnet contour surface, thereby enabling the permanent magnet to hardly interlink with the demagnetizing field.

Further, on the other hand, when the arc of the permanent magnet on the inner peripheral side and the arc thereof on the outer peripheral side are concentric with each other as described above, the permanent magnet may be moved inside the magnet insertion hole due to an electromagnetic force generated during the drive of the motor, thereby causing difficulty in securing the air gap portions configured to suppress the demagnetization. As a countermeasure therefor, the following method is conceivable. A width of both the side end surfaces of the magnet insertion hole is set smaller than a width of both the side end surfaces of the permanent magnet so as to form a pair of abutment portions in the vicinities of the side end surfaces of the magnet insertion hole, which are configured to be held in contact with the side end surfaces of the permanent magnet, respectively. Through the contact between those abutment portions and both the side end surfaces of the permanent magnet, the movement of the permanent magnet is restricted while securing the air gap portions between both the side end surfaces of the magnet insertion hole and both the side end surfaces of the permanent magnet. However, in the above-mentioned method, the width of the magnet insertion hole is reduced so that the magnetic resistance is reduced. Accordingly, there is a problem in that an effect of suppressing the demagnetization, which is attained by the air gap portions, may be reduced.

To cope with such a problem, in the first embodiment, the straight surfaces are formed on both the radially-inner magnet contour surface of the permanent magnet and the radially-inner insertion hole contour surface of the magnet insertion hole. With this configuration, even though the permanent magnet and the magnet insertion hole are each formed into the arc shape that is convex toward the center side of the rotor, and the air gap portions are each secured between the side-end magnet contour surface of the permanent magnet and the side-end insertion hole contour surface of the magnet insertion hole, when the permanent magnet is to be moved along the arc-shaped magnet insertion hole, the straight surface of the permanent magnet is caught on the arc surface of the radially-inner insertion hole contour of the magnet insertion hole, or the arc surface of the radially-inner magnet contour of the permanent magnet is caught on the straight surface of the magnet insertion hole. In this manner, the movement of the permanent magnet along the arc-shaped magnet insertion hole can be suppressed. This suppression is attained when, for example, under the state in which the permanent magnet is inserted into the magnet insertion hole, as viewed in an extending direction of the rotation center line CL of the rotor (insertion direction of the permanent magnet), at least a part of the straight surface of the radially-inner magnet contour surface and at least a part of the straight surface of the radially-inner insertion hole contour surface are held in contact with each other. Further, description is given of an example of the illustration. Under the state in which the permanent magnet is inserted into the magnet insertion hole, as viewed in the extending direction of the rotation center line CL of the rotor (insertion direction of the permanent magnet), the radially-outer magnet contour surface and the radially-outer insertion hole contour surface are held in contact with each other entirely or partially, the second arc surface of the radially-inner magnet contour surface and the second arc surface of the radially-inner insertion hole contour surface are held in contact with each other entirely or partially, and the straight surface of the radially-inner magnet contour surface and the straight surface of the radially-inner insertion hole contour surface are held in contact with each other entirely or partially. With this, even though the permanent magnet and the magnet insertion hole are each formed into the arc shape that is convex toward the center side of the rotor, and the air gap portions are each secured between the side-end magnet contour surface of the permanent magnet and the side-end insertion hole contour surface of the magnet insertion hole, the movement of the permanent magnet inside the magnet insertion hole can be suppressed. As described above, the efficiency of the motor can be enhanced and the compactification of the motor can be attained. Further, the movement of the permanent magnet can be restricted while avoiding the reduction of the effect of suppressing the demagnetization. In particular, when ferrite magnets are used as the permanent magnets, the ferrite magnet has coercivity lower than that of a rare-earth magnet, and hence the effect of enabling the magnet to be hardly demagnetized is more remarkably exerted. That is, the movement of the permanent magnet can be restricted without relying on the presence of the abutment portions of the magnet insertion hole to be held in contact with the side end surfaces of the permanent magnet.

Further, the straight surfaces are formed on the portions of the permanent magnet and the magnet insertion hole on the radially inner side so as to extend perpendicularly to the magnetic pole center line. Thus, the movement of the permanent magnet can be restricted without degrading the performance and the demagnetization characteristics, and the range of the drive current can be increased and the output can be improved.

The ferrite magnets are used as the permanent magnets, and the center of the first arc surface and the center of the second arc surface are set to coincide with the orientation center of the permanent magnet. In this case, the radially inner surface and the radially outer surface of the ferrite magnet are formed into a certain concentric arc shape, and the thickness of the ferrite magnet in a radial direction of the curvature is uniformly maintained at about 6 mm excluding the straight surface. The magnet to which an orientation magnetic field is applied from the center of the concentric arcs is used, and the magnet is inserted into the magnet insertion hole having a shape conforming to the magnet. With this, the magnetic flux of the permanent magnet is generated in a direction perpendicular to the first arc surface and the second arc surface, and hence the magnetic flux of the permanent magnet is uniformly generated in a core portion corresponding to the magnetic pole surface without causing local concentration of the magnetic flux. Thus, the magnetic flux of the permanent magnet effectively interlinks with the stator. Further, the shapes of the ferrite magnets are individually molded using a die. Therefore, the ferrite magnets have a higher degree of freedom in shape than the rare-earth magnets obtained by slicing a molded block, and hence are also suitable for realizing the above-mentioned specific curved shape in which the arc surface and the straight surface are mixed.

Figure 5:
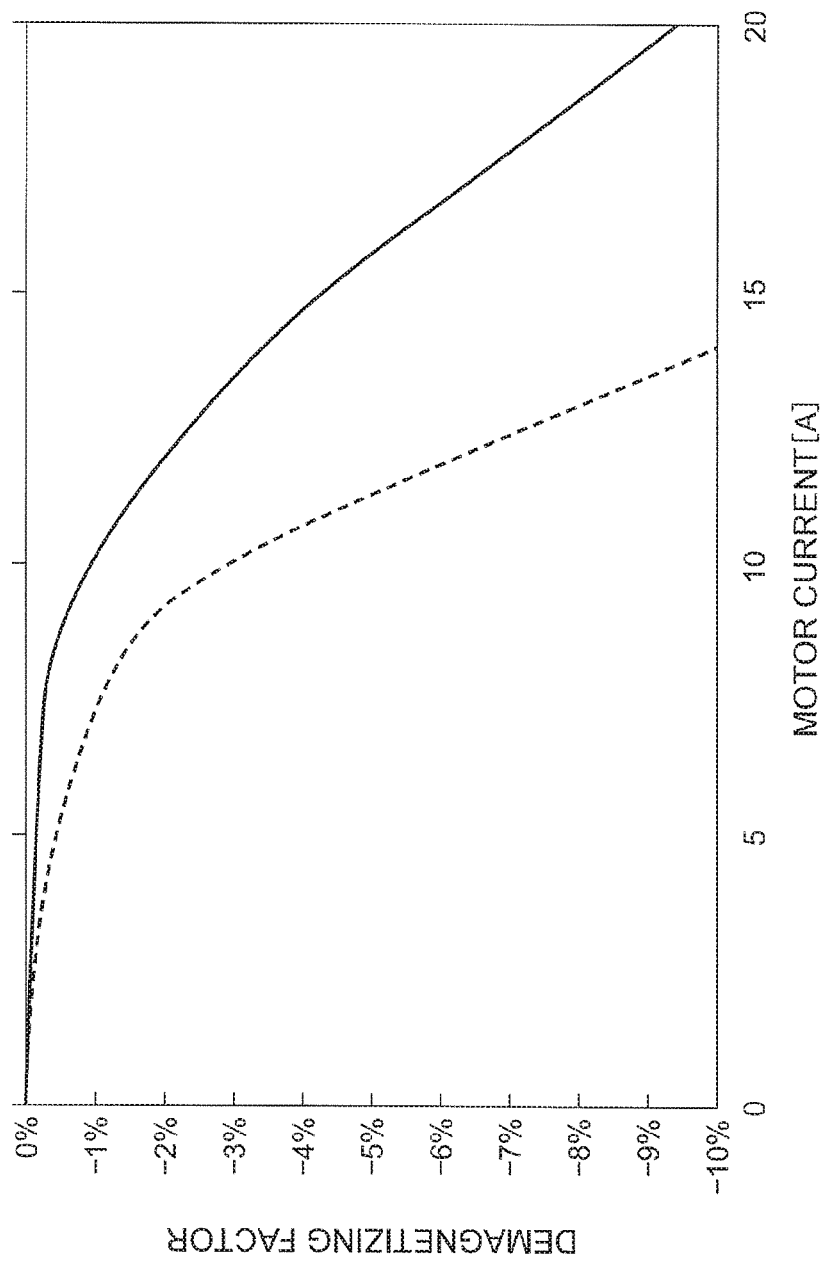
FIG. 5 is a graph for comparing demagnetizing factors with respect to a motor current between the first embodiment and an illustration example.
Figure 6:
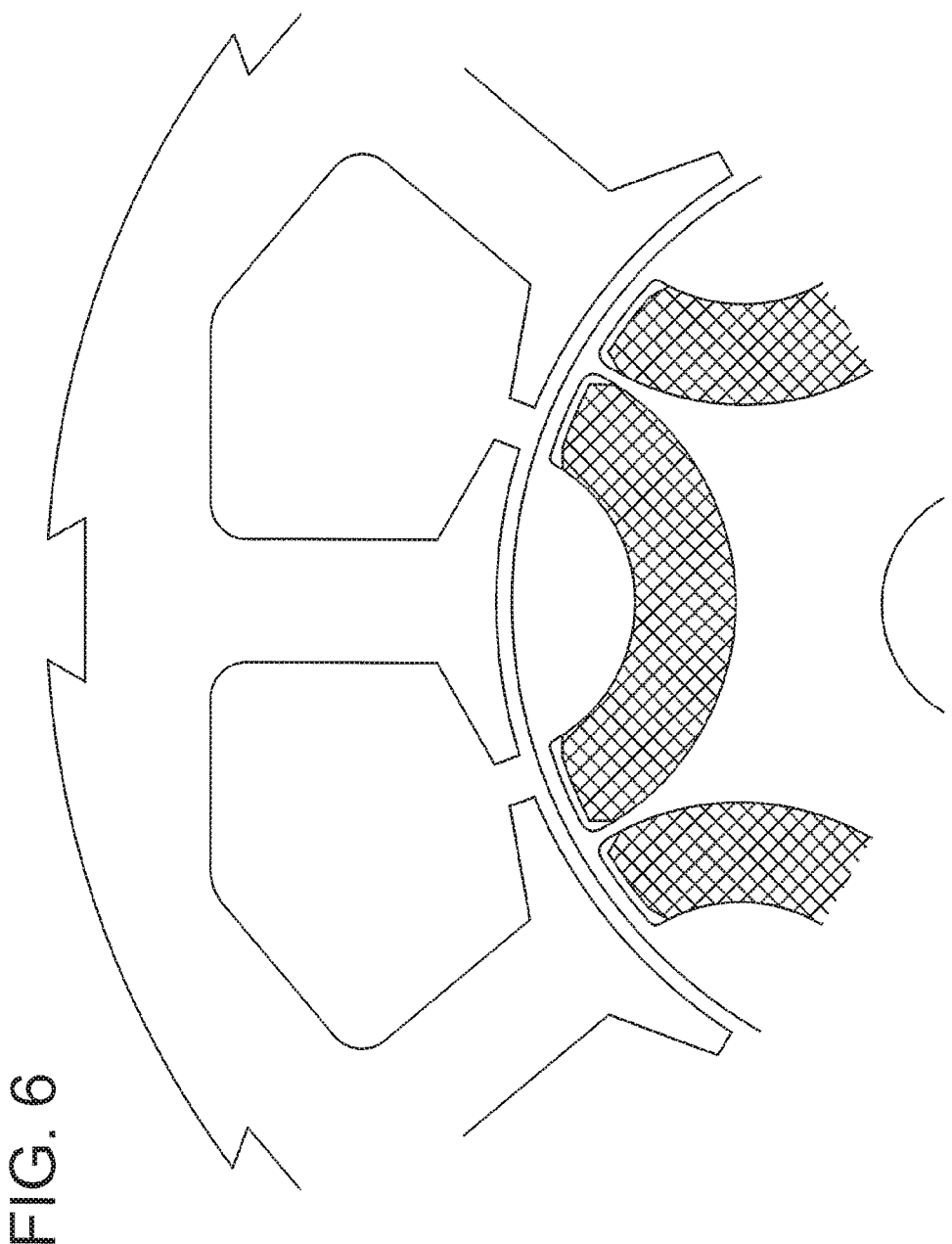
FIG. 6 is a view according to the illustration example in the same manner as that of FIG. 2.

Note that, an example of an effect of improving a demagnetizing factor in the interior permanent magnet motor of the first embodiment is described. FIG. 5 is a graph for comparing demagnetizing factors with respect to a motor current between the first embodiment and an illustration example when the stator is energized so that an armature magnetic flux in a phase opposite to the permanent magnet of the rotor is generated. The solid line in the graph indicates a result of the first embodiment, and the dotted line in the graph indicates a result of the illustration example. FIG. 6 is a view according to the illustration example in the same manner as that of FIG. 2. As illustrated in FIG. 6, the illustration example serving as an object to be compared has a configuration that the air gap portions are secured each between the side-end insertion hole contour surface of the magnet insertion hole and the side-end magnet contour surface of the permanent magnet, but the straight surfaces illustrated in the first embodiment are not formed. Therefore, the permanent magnet is moved in the magnet insertion hole during the drive.

The demagnetizing factor represents a ratio of amounts of the magnetic flux on the rotor surface before and after the energization. When the permanent magnet is demagnetized, the performance of the motor is varied. Thus, in order to ensure the reliability of the motor, for example, an overcurrent interruption protective function is secured in a circuit so as to prevent a flow of a current leading to a demagnetizing factor of 3% or more. In a motor that is demagnetized with a small current, a breaking current is small, and hence the motor cannot be operated in a high-load region. Under such a background, in FIG. 5, comparing values of currents leading to the demagnetizing factor of 3% between the illustration example and the first embodiment, the value is larger in the first embodiment by approximately 35%. Accordingly, it is understood that the resistance to demagnetization is significantly improved in the first embodiment as compared to the configuration of the illustration example. Therefore, it is understood that the motor of the first embodiment can be constructed as a highly reliable motor that is not demagnetized even in the high-load region.

Further, in the first embodiment, the air gap between the rotor outer peripheral surface and the stator inner peripheral surface is secured so as to be increased as approaching from the magnetic pole center portion to the inter-pole portion. Accordingly, the magnetic resistance of the rotor surface is increased as approaching from the magnetic pole center portion to the inter-pole portion. Thus, a magnetic flux density distribution on the rotor surface corresponds to a distribution similar to a sine wave having the highest magnetic flux density at the magnetic pole center portion. Accordingly, a harmonic component of the magnetic flux density can be reduced to reduce vibration and noise of the motor. Moreover, a part of the rotor outer peripheral surface, which is positioned on the radially outer side with respect to the side surface portion of the permanent magnet that is easily demagnetized, is formed by the second arc. Thus, the air gap between the tooth portion and the above-mentioned part is wide so that the magnetic resistance is increased. Thus, the configuration in which the armature magnetic flux hardly interlinks with the permanent magnet is attained, thereby enabling the permanent magnet to be hardly demagnetized.

Second Embodiment

Figure 8:
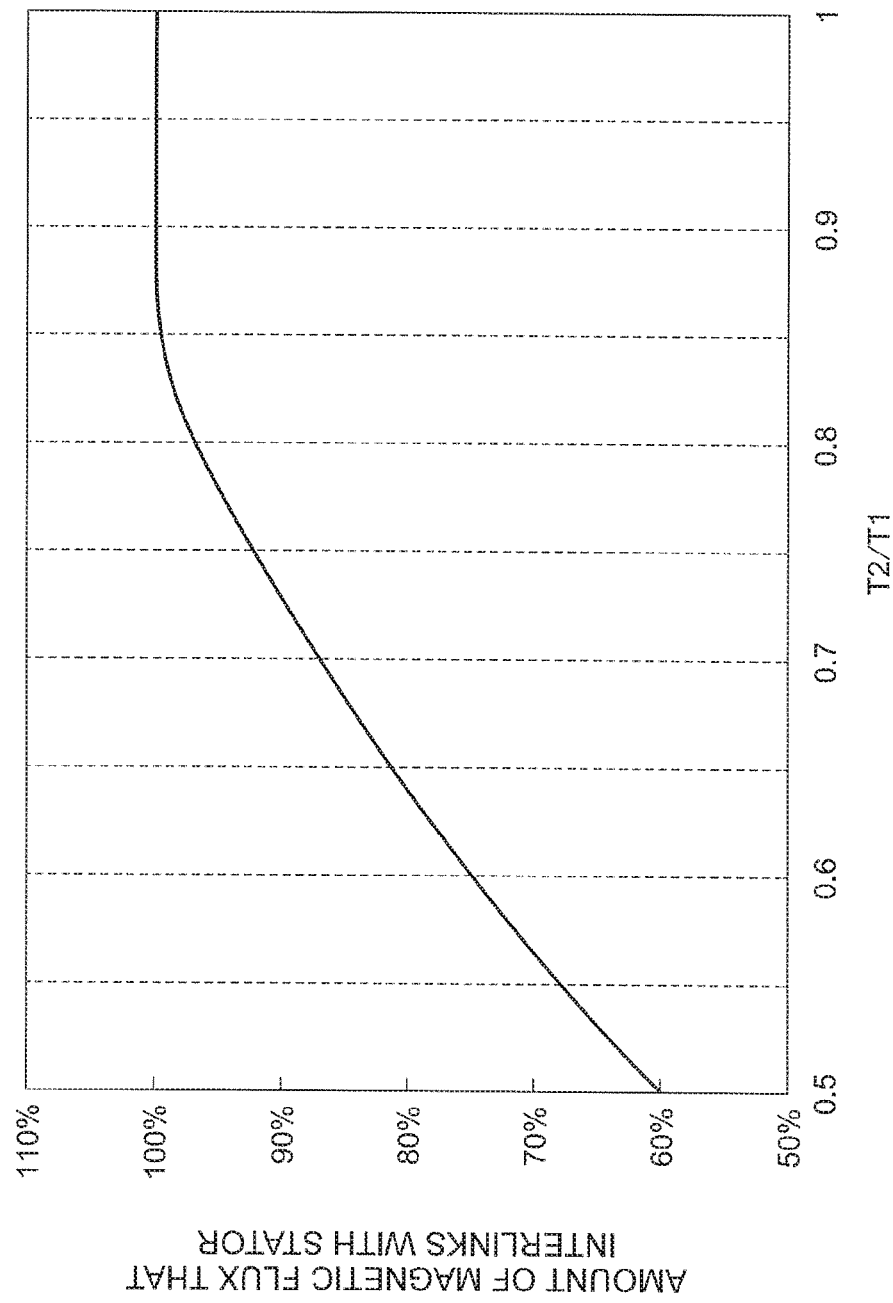
FIG. 8 is a graph for showing a relationship between a thickness of the permanent magnet and an amount of a magnetic flux that interlinks with a stator.

Next, an interior permanent magnet motor according to a second embodiment of the present invention is described. FIG. 7 is a view according to the second embodiment of the present invention in the same manner as that of FIG. 2. FIG. 8 is a graph for showing a relationship between a thickness of the permanent magnet and an amount of a magnetic flux that interlinks with the stator. Note that, the second embodiment has the same configuration as that of the above-mentioned first embodiment except for portions described below.

In the second embodiment, assuming that a thickness of the permanent magnet 19 between the first arc surface and the second arc surface (dimension in a radial direction of the arc) is represented by T1, and a thickness of the permanent magnet 19 on the magnetic pole center line ML is represented by T2, the thicknesses T1 and T2 fall within a range of $0.85 \leq (T2/T1) \leq 0.95$.

In the second embodiment constructed as described above, the following advantages can be obtained in addition to the advantages in the above-mentioned first embodiment. When the straight surface is formed at the magnetic pole center portion of the permanent magnet, the magnet thickness of the magnetic pole center portion is reduced correspondingly, and at the same time, the volume of the magnet is reduced as compared to the structure without the straight surface. Therefore, in the second embodiment, when the straight surface is formed, reduction of the magnet amount and reduction of the magnetic resistance of the magnet itself are offset so that a suitable magnet thickness is realized in terms of securing the amount of the magnetic flux. That is, in the second embodiment, as described above, the thicknesses T1 and T2 of the permanent magnet are set so as to fall within the range of $0.85 \leq (T2/T1) \leq 0.95$. Thus, as shown in FIG. 8, even when the magnet thickness of the magnetic pole center portion is reduced due to the presence of the straight surface, due to the effect of offsetting the reduction of the magnet amount and the reduction of the magnetic resistance of the magnet itself, the reduction of the amount of the magnetic flux can be suppressed to 1% or less. Note that, as a specific example, the permanent magnet 19 is constructed to have the above-mentioned thickness T1 of 6 mm and the above-mentioned thickness T2 of 5.5 mm.

Third Embodiment

Figure 9:
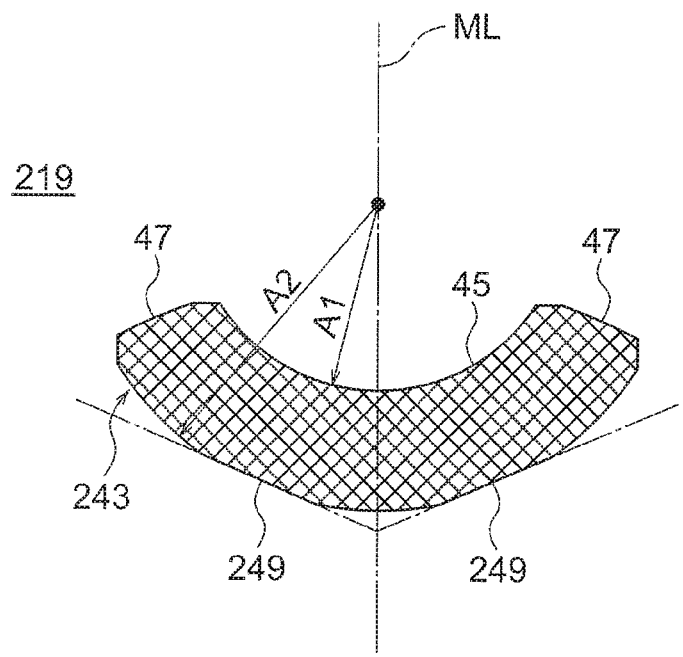
FIG. 9 is a view according to a third embodiment of the present invention in the same manner as that of FIG. 3.

Next, an interior permanent magnet motor according to a third embodiment of the present invention is described. FIG. 9 is a view according to the third embodiment in the same manner as that of FIG. 3. Note that, the third embodiment has the same configuration as that of the above-mentioned first embodiment except for portions described below.

The straight surface of the permanent magnet according to the present invention is not limited to be formed on the magnetic pole center line ML, and at least one straight surface only needs to be formed on the radially-inner magnet contour surface of the permanent magnet. In the third embodiment, a permanent magnet 219 has two straight surfaces 249 on a radially-inner magnet contour surface 243, and this pair of straight surfaces 249 are arranged to be line symmetric with respect to the magnetic pole center line ML as the center. Note that, although not illustrated, a magnet insertion hole configured to receive the permanent magnet 219 also has a pair of straight surfaces configured to be held in contact with the pair of straight surfaces 249 of the permanent magnet 219. That is, also in the third embodiment, similarly to the case of the above-mentioned first embodiment, the magnet insertion hole and the permanent magnet 219 are configured to be closely held in contact with each other except for the presence of the air gap portions at side end portions.

Also in the third embodiment described above, advantages similar to the above-mentioned first embodiment are obtained. That is, the movement of the permanent magnet can be restricted without relying on the presence of the abutment portions of the magnet insertion hole to be held in contact with the side end surfaces of the permanent magnet.

Fourth Embodiment

Next, an interior permanent magnet motor according to a fourth embodiment of the present invention is described. Note that, the fourth embodiment has the same configuration as that of any one of the above-mentioned first to third embodiments except for portions described below.

The interior permanent magnet motor according to the fourth embodiment has a feature in a relationship between the straight surfaces of the magnet insertion hole and the permanent magnet and an air hole. As a specific illustrated example, FIG. 1, FIG. 2, FIG. 4, and FIG. 7 described above are given. As illustrated in FIG. 1, FIG. 2, FIG. 4, and FIG.

7, on a radially inner side of the rotor core with respect to the magnet insertion holes, in particular, on a radially inner side of the rotor core with respect to the straight surfaces, there is formed at least one air hole (plurality of air holes 71 in the illustrated example) configured to allow a refrigerant and an oil to pass therethrough when the interior permanent magnet motor is mounted on a compressor. Note that, reference symbol 73 denotes a rivet hole. The air holes 71 and the rivet holes 73 are alternately arrayed in the circumferential direction, and the air holes 71 and the rivet holes 73 are arrayed equiangularly. Each of the air holes 71 and the rivet holes 73 are positioned in a corresponding inter-pole portion.

In the illustrated example, three air holes 71 are arc-shaped elongated holes that are convex toward the radially-inner magnet contour surfaces 43 (243) of the permanent magnets 19 (219). The three air holes 71 are arranged on the same circumference about the rotor center so as to be separated equiangularly. Each of the elongated holes is arranged across radially inner parts of corresponding two permanent magnets to attain a configuration in which the air hole 71 is positioned on the radially inner side (on the magnetic pole center line) with respect to the straight surface 49 (249) of each of all the permanent magnets. It is preferred that an interval between the straight surface and the air hole be reduced so as to easily cool the permanent magnets, and it is preferred that the interval between the straight surface and the air hole on the magnetic pole center axis be 3 mm or less. In this case, as an example, the interval between the straight surface and the air hole on the magnetic pole center axis is set to 2 mm.

Also in the fourth embodiment described above, advantages similar to the advantages of any one of the corresponding first to third embodiments are obtained, and further, the following advantages are obtained. That is, the straight surface is formed on each of the magnet insertion holes to enlarge a space on the rotor core on the radially inner side with respect to the magnet insertion holes, and the air holes are formed in the enlarged space. Therefore, when the interior permanent magnet motor is used in the compressor, the refrigerant and the oil easily pass through the air holes, thereby being capable of enhancing the performance of the compressor. Further, the thickness of the permanent magnet is smallest at the magnetic pole center portion, and accordingly, the magnetic flux density in the vicinity of the magnetic pole center portion may be slightly lowered. However, the air holes are formed on the radially inner side with respect to the straight surfaces, thereby attaining an effect of cooling the magnetic pole center portion of each of the permanent magnets. Thus, a residual magnetic flux density of each of the magnets is increased due to the cooling, thereby being capable of suppressing the lowering of the magnetic flux density, which may be caused when the magnet thickness is reduced at the magnetic pole center portion.

Further, in general, when the air holes are formed in the vicinity of the radially inner side of the permanent magnets in a wide range, the air holes function as the magnetic resistance, and the amount of the magnetic flux generated from each of the permanent magnets is reduced. However, in the rotor in which the arc-shaped permanent magnets are each arranged so that the convex portion side faces the center side of the rotor, the interval between the permanent magnet and the air hole can be increased as approaching from the magnetic pole center portion to the inter-pole portion. Thus, the effect of the magnetic resistance by the air holes can be alleviated, thereby being capable of attaining structure that less influences the performance in the magnetic path.

Fifth Embodiment

Next, as a fifth embodiment of the present invention, there is described a rotary compressor having the interior permanent magnet motor according to any one of the above-mentioned first to fourth embodiments mounted therein. Note that, the present invention encompasses a compressor having the interior permanent magnet motor according to any one of the above-mentioned first to fourth embodiments mounted therein. However, the type of the compressor is not limited to the rotary compressor.

FIG. 10 is a vertical sectional view of the rotary compressor having the interior permanent magnet motor mounted therein. A rotary compressor 100 includes the interior permanent magnet motor 1 (motor element) and a compression element 103 in an airtight container 101. Although not illustrated, a refrigerating machine oil for lubricating each of sliding portions of the compression element 103 is stored in a bottom portion of the airtight container 101.

The compression element 103 includes, as main components thereof, a cylinder 105 arranged in a vertically stacked state, a rotary shaft 107 serving as a shaft rotated by the interior permanent magnet motor 1, a piston 109 to be fitted by insertion into the rotary shaft 107, a vane (not shown) dividing an inside of the cylinder 105 into an intake side and a compression side, an upper frame 111 and a lower frame 113 being a pair of upper and lower frames into which the rotary shaft 107 is to be rotatably fitted by insertion and which are configured to close axial end surfaces of the cylinder 105, and mufflers 115 mounted on the upper frame 111 and the lower frame 113, respectively.

The stator 3 of the interior permanent magnet motor 1 is directly fixed to the airtight container 101 by a method such as shrink fitting or welding and is held thereby. The coil of the stator 3 is supplied with power from a glass terminal fixed to the airtight container 101.

The rotor 5 is arranged through intermediation of an air gap on the radially inner side of the stator 3, and is held in a rotatable state by the bearing portions (upper frame 111 and lower frame 113) of the compression element 103 via the rotary shaft 107 (shaft 13) in the center portion of the rotor 5.

Next, an operation of the rotary compressor 100 is described. A refrigerant gas supplied from an accumulator 117 is taken into the cylinder 105 through an intake pipe 119 fixed to the airtight container 101. The interior permanent magnet motor 1 is rotated by energization of an inverter so that the piston 109 fitted to the rotary shaft 107 is rotated in the cylinder 105. With this, the refrigerant is compressed in the cylinder 105. The refrigerant, which has passed through the muffler 115, rises in the airtight container 101. At this time, the refrigerating machine oil is mixed into the compressed refrigerant. When the mixture of the refrigerant and the refrigerating machine oil passes through the air holes formed in the rotor core 11, the refrigerant and the refrigerating machine oil are promoted to be separated from each other, and hence the refrigerating machine oil can be prevented from flowing into a discharge pipe 121. In this manner, the compressed refrigerant is supplied on a high-pressure side of the refrigeration cycle through the discharge pipe 121 arranged on the airtight container 101.

Note that, as the refrigerant for the rotary compressor 100, R410A, R407C, R22, or the like that has hitherto been used may be used, but any refrigerant such as a refrigerant having a low global warming potential (GWP) can also be applied. In view of the prevention of global warming, a low GWP refrigerant is desirable. As typical examples of the low GWP refrigerant, the following refrigerants are given.

(1) A halogenated hydrocarbon having a carbon double bond in the composition; for example, HFO-1234yf (CF3CF=CH2) is given. An HFO is an abbreviation of a Hydro-Fluoro-Olefin, and an Olefin is an unsaturated hydrocarbon having one double bond. Note that, a GWP of HFO-1234yf is 4.

(2) A hydrocarbon having a carbon double bond in the composition; for example, R1270 (propylene) is given. Note that, R1270 has a GWP of 3, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure refrigerant, is large in pressure loss and is thus liable to degrade the performance of the refrigeration cycle (in particular, in an evaporator). Therefore, a mixture of HFO-1234yf and R32 or R41 that is a refrigerant higher in pressure than HFO-1234yf is positively used in practical.

Also in the rotary compressor according to the fifth embodiment, which is constructed as described above, advantages similar to the advantages of any one of the corresponding first to fourth embodiments described above are obtained.

Sixth Embodiment

Further, the present invention may be carried out as a refrigeration and air conditioning apparatus including the compressor according to the above-mentioned fifth embodiment as a component of a refrigeration cycle. Note that, configurations of components other than the compressor of the refrigeration cycle of the refrigeration and air conditioning apparatus are not particularly limited.

In the above, the details of the present invention are specifically described referring to the preferred embodiments. However, it is apparent to those skilled in the art that various modifications may be made based on the basic technical concept and the teachings of the present invention.

The invention claimed is:

1. An interior permanent magnet motor, comprising:
a stator; and
a rotor rotatably arranged so as to be opposed to the stator,
wherein the rotor comprises a rotor core having a plurality of magnet insertion holes formed therein, into which corresponding permanent magnets are respectively inserted,
wherein the plurality of permanent magnets and the plurality of magnet insertion holes are each formed into an arc shape that is convex toward a center side of the rotor and is concave toward an outer side of the rotor,
wherein each of the permanent magnets has a radially-inner magnet contour surface, a radially-outer magnet contour surface, and a pair of side-end magnet contour surfaces,
wherein each of the magnet insertion holes has a radially-inner insertion hole contour surface, a radially-outer insertion hole contour surface, and a pair of side-end insertion hole contour surfaces,
wherein the radially-outer magnet contour surface and the radially-outer insertion hole contour surface are each formed by an outer arc surface,
wherein each of the radially-inner magnet contour surface and the radially-inner insertion hole contour surface is formed by at least one straight surface located between two inner arc surfaces, the two inner arc surfaces and the at least one straight surface being configured to suppress movement of the permanent magnet along the magnet insertion hole having the arc shape,
wherein air gap portions are formed between the side-end magnet contour surfaces and the side-end insertion hole contour surfaces when the permanent magnets are inserted into the corresponding magnet insertion holes,
wherein a contour of ends of the magnet inserting hole in a radial direction is not tapered, and
wherein a first arc that defines the radially-outer magnet contour surface of the permanent magnets, the two inner arc surfaces of the radially-inner magnet contour surface of the permanent magnets, a second arc that defines the radially-outer insertion hole contour surface of the magnet insertion holes, and the two inner arc surfaces of the radially-inner insertion hole contour surface of the magnet insertion holes all have a common radius center.

2. An interior permanent magnet motor according to claim 1, wherein, when viewed in an extending direction of a rotation center line of the rotor, at least a part of the at least one straight surface of the radially-inner magnet contour surface and at least a part of the at least one straight surface of the radially-inner insertion hole contour surface are held in contact with each other.

3. An interior permanent magnet motor according to claim 2, wherein, when viewed in the extending direction of the rotation center line of the rotor, at least a part of the radially-outer magnet contour surface and at least a part of the radially-outer insertion hole contour surface are held in contact with each other, at least a part of the inner arc surface of the radially-inner magnet contour surface and at least a part of the inner arc surface of the radially-inner insertion hole contour surface are held in contact with each other, and at least the part of the at least one straight surface of the radially-inner magnet contour surface and at least the part of the at least one straight surface of the radially-inner insertion hole contour surface are held in contact with each other.

4. An interior permanent magnet motor according to claim 1, wherein the at least one straight surface is formed in a direction orthogonal to a corresponding magnetic pole center line when viewed in a cross-section orthogonal to a rotation center line of the rotor.

5. An interior permanent magnet motor according to claim 4, wherein, a thickness of the permanent magnet between the outer arc surface and the inner arc surface is represented by T1, a thickness of the permanent magnet on the magnetic pole center line is represented by T2, and the thickness T1 and the thickness T2 fall within a range of $0.85 < (T2/T1) < 0.95$.

6. An interior permanent magnet motor according to claim 1, wherein at least one air hole is formed in the rotor core so as to be positioned on a radially inner side with respect to the at least one straight surface of the each of the magnet insertion holes.

7. An interior permanent magnet motor according to claim 1,
wherein an air gap is secured between a rotor outer peripheral surface of the rotor and a stator inner peripheral surface of the stator,
wherein, when viewed in a cross-section orthogonal to the rotation center line of the rotor, the rotor outer peripheral surface is formed by a plurality of first radial surfaces and a plurality of second radial surfaces, wherein each of the first radial surfaces is positioned in a corresponding magnetic pole center portion on the rotor outer peripheral surface, wherein each of the second radial surfaces is positioned in a corresponding inter-pole portion on the rotor outer peripheral surface, and wherein the first radial surface bulges toward a radially outer side to a higher degree than the second radial surface so that the air gap is varied in a manner of being increased as approaching from each of the magnetic pole center portions to the adjacent inter-pole portions.

8. An interior permanent magnet motor according to claim 1, wherein the permanent magnets comprise ferrite magnets.

9. A compressor, comprising, in an airtight container:
a motor; and
a compression element,
wherein the motor comprises the interior permanent magnet motor of claim 1.

10. A refrigeration and air conditioning apparatus, comprising the compressor of claim 9 as a component of a refrigeration cycle.

11. An interior permanent magnet motor according to claim 1, wherein
the outer arc surface has an outer arc radius, measured from a point on a magnetic pole center line of the rotor outside of the radial extent of the rotor,
the plurality of inner arc surfaces each have an inner arc radius, measured from the point on the magnetic center line of the rotor, larger than the first arc radius.

12. An interior permanent magnet motor according to claim 1, wherein
intersections of the at least one straight surface with the plurality of inner arc surfaces of the radially inner magnet contour surface, and intersections of the at least one straight surface with the plurality of inner arc surfaces of the radially-inner insertion hole contour surface, are configured to suppress movement of the permanent magnet along the magnet insertion hole.

13. An interior permanent magnet motor according to claim 1, wherein
the at least one straight surface includes at least first and second straight surfaces,
the plurality of inner arc surfaces include at least first, second, and third arc surfaces
each of the radially-inner magnet contour surface and the radially-inner insertion hole contour surface are formed by at least the first, second, and third arc surfaces, and the first and second straight surfaces,
the first straight surface is located between the first and second arc surfaces, and
the second straight surface is located between the second and third arc surfaces.

14. An interior permanent magnet motor according to claim 1, wherein
an outer surface of the rotor is made up of a plurality of first radial surfaces and a plurality of second radial surfaces,
the first radial surfaces have a first radius, measured from a first point on a magnetic pole center line of the rotor, smaller than a second radius of the second radial surfaces, measured from a second point on a magnetic pole center line of the rotor,
the first radial surfaces are formed to be opposite the radially-outer magnet contour surface and the radially-outer insertion hole contour surface in each of the magnet insertion holes,
the second radial surfaces are formed to be opposite the air gap portions in adjacent magnetic insertion holes, and
the second point is closer to the center point of the rotor than the first point.

* * * * *